April 29, 1969 H. J. SCHLADITZ 3,441,408
HIGH STRENGTH METAL FILAMENTS AND THE PROCESS
AND APPARATUS FOR FORMING THE SAME
Filed Nov. 10, 1965
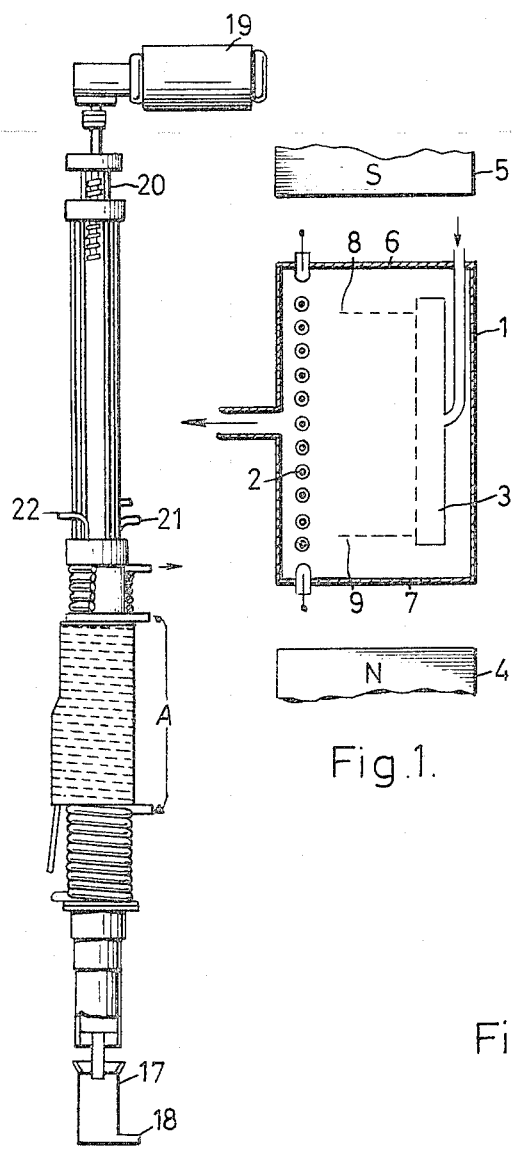
Fig.1.
Fig.3.
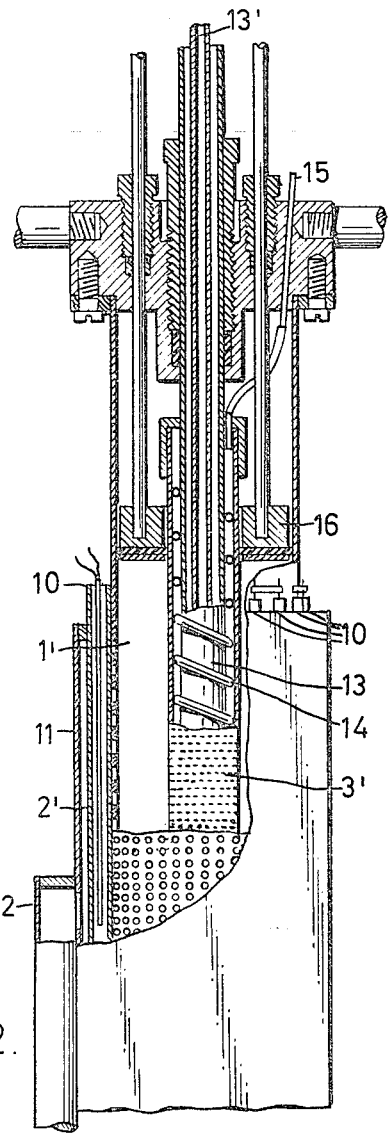
Fig.2.
INVENTOR:
HERMANN J. SCHLADITZ
BY
Attorneys

United States Patent Office 3,441,408
Patented Apr. 29, 1969

3,441,408
HIGH STRENGTH METAL FILAMENTS AND THE PROCESS AND APPARATUS FOR FORMING THE SAME
Hermann J. Schladitz, 12–14 Ruffini Strasse, Munich, Germany
Filed Nov. 10, 1965, Ser. No. 507,121
Claims priority, application Germany, Nov. 11, 1964, Sch 36,084
Int. Cl. B22f 7/02
U.S. Cl. 75—208    8 Claims

ABSTRACT OF THE DISCLOSURE

A metal filament of predetermined length and thickness whose core is formed from the gas phase of small quantities of a ferromagnetic carbonyl within a temperature gradient sufficient to decompose the carbonyl and form a chain-like aggregate along the lines of force of an induced magnetic field. Thereafter the temperature gradient is reduced and relatively greater quantities of metal atoms of carbonyl vapor of ferromagnetic and/or paramagnetic carbonyls are deposited on the aggregate to form said filament.

---

The present invention relates to an improved metal filament of hair-like cross section, the process for producing the filament and the apparatus for performing the process. More specifically, the invention relates to a polycrystalline metal filament formed from the gas phase of the metal to any predetermined length and thickness.

It is well known that in the case of metal colloids forming ferromagnetic single domains (so called Weiss' regions), the coagulation or agglomeration of the colloidal particles to form aggregates can be effected in flowing gases at a very high velocity so as to produce chains formed of elementary crystallites. Such chain-shaped coagulations are the cause of the formation of an incidental byproduct in the production of iron powder by decomposing iron carbonyl, and cause matted compositions known as iron wadding to be formed. Attempts have already been made to produce similar linear aggregations intentionally by using concentrating magnetic fields to produce rod-like magnetic materials, to be used for example as magnetic sound-track supports. However, these known processes cannot produce metal filaments of homogeneous structure or of predetermined length and thickness, since the uninhibited growth of the originally very small primary metal colloids leads to the agglomeration of granular aggregates of varying particle sizes.

It is an object of the invention to provide a process and apparatus for forming polycrystalline metal having filaments of controlled length and thickness from the gas phase of a carbonyl so that the formed filaments are of substantially high strength.

It is another object of the invention to provide polycrystalline metal filaments of varying chemical properties and characteristics.

In carrying out the process of my invention, it is generally contemplated to feed small quantities of carbonyl of ferromagnetic metals into an oxygen-free chamber in the proportion from approximately $10^{-4}$ to $10^{-10}$ moles per cubic centimeter per chamber volume. The carbonyl particles are decomposed when subjected to a falling temperature gradient so that the metal atoms are liberated and agglomerate along the lines of force of an homogeneous magnetic field of at least 5,000 gauss to form minute polycrystalline filaments which are arranged in chain-like aggregates. Thereafter, simultaneously feeding additional carbonyl vapors of ferromagnetic and paramagnetic compounds through the chamber as the falling temperature gradient within the chamber is reduced so that the ferromagnetic and/or paramagnetic compounds are coherently deposited on the chain-like aggregate to form controlled filaments of predetermined length and thickness.

By the process of this invention, it is possible to form metal filaments with a very high diameter/length ratio, for example 1:100,000 and more. The ratio of the diameter of the filament to the diameter of the primary chain-like aggregate may be a million to one or more. By a sintering process, the filaments may be used for reinforcing materials, such as plastics or other metals. The filaments as formed by the process of this invention lend hitherto unobtainable strength to such materials.

During this description reference is made to a ferromagnetic material and unless otherwise stated, such material will be considered to relate to that class of substances that are characterized by an abnormally high magnetic permeability, a definite saturation point and appreciable residual magnetism and hysteresis. Ferromagnetic carbonyls that may be employed are for example, iron pentacarbonyl, nickel tetracarbonyl, chromium carbonyl, magnesium carbonyl and cobalt carbonyl or numerous alloys formed from any ferromagnetic carbonyls.

Similarly paramagnetic materials or paramagnetism relates to a magnetizable substance, that like aluminum and platinum has small but positive susceptibility varying but little with a magnetizing force (materials which are but slightly more magnetic than a vacuum and are therefore weakly attracted by the poles of an electromagnet). Paramagnetic carbonyls that may be employed are for example, molybdenum carbonyl, tungsten carbonyl, platinum or other precious metal carbonyls or numerous alloys formed from any paramagnetic carbonyls.

In carrying out the process of the invention the temperature employed will vary according to the particular carbonyl material used. For example, the temperature gradient varies when employing iron carbonyl as against nickel carbonyl. The temperature gradient for iron carbonyl is approximately 200° C. and for nickel carbonyl approximately 150° C. Likewise, for molybdenum carbonyl the temperature gradient is approximately 70° C.

In the accompanying drawings which exemplify a preferred form of my apparatus;
FIGURE 1 is a diagrammatic illustration of one embodiment of the apparatus for performing the invention;
FIGURE 2 is a partial side elevation, partly broken away and partly in section, of one preferred constructional form of the apparatus, representing the portion A of FIGURE 3; and
FIGURE 3 is a side elevation, partly in section, of the whole apparatus of the embodiment of FIGURE 2.

Referring now to the drawings and in particular the device as schematically shown in FIG. 1, there is provided a reaction vessel 1 having an internal chamber. Within the chamber there is an electrically insulated heating surface 2 which is longitudinally disposed adjacent one wall of the vessel. The surface is one which is permeable to gases. A vaporizing or discharging source 3 is also longitudinally disposed within the chamber and transversely spaced from the heating surface. The source is supplied with the gaseous metallic compound by means not shown and the gaseous compound is discharged into the chamber through a multiplicity of pores provided in the wall adjacent the heating surface. The discharge is directed to a falling temperature gradient produced within the region of discharge between the surface and source and due to the multiplicity of pores the discharge will be in a uniform stream with a minimum of turbulence. The discharge particles are of up to the colloidal size.

The chamber of the reaction vessel 1 is subjected to a magnetic field whose lines of force are parallel to the heating surface 2. This magnetic field is substantially homogeneous over the area of the heating surface 2 and is produced by means of magnetic poles 4 and 5 longitudinally positioned at suitable distances from the reaction chamber. The magnetic field strength is preferably at least 5000 gauss. The field may also be produced by means of a magnetic coil.

To form the chain the normally existing gases within the reaction chamber are completely replaced by oxygen-free gases in accordance with usual methods, as are well known, and the temperature of the heating surface 2 is raised to a temperature well above the temperature at which the metal carbonyl completely decomposes. The oxygen-free atmosphere may be a vacuum or may be an inert gas by which a positive pressure is exerted on the chamber walls.

In the case of iron pentacarbonyl, for example, the temperature of the heating surface should be within the range of about 250° C. to 350° C. Other temperatures are required for other metals as brought out above.

Metal carbonyl is ejected into the reaction chamber of the vessel 1. The metal carbonyl is released through the pores of the source 3, and the small amount delivered to the chamber is in the proportion from $10^{-4}$ to $10^{-10}$ moles per cubic centimeter of the reaction chamber volume. Since the metal carbonyl is fed into the reaction chamber in a substantially turbulent-free stream from the several pores, decomposition of the metal carbonyl occurs on a broad front as the carbonyl flows towards the heating surface and against the falling temperature gradient. During the flow, metal atoms are liberated which rapidly form ferromagnetic crystallites. These, in turn, very rapidly form the desired primary chain-like aggregates. The ratio of the amount of metal carbonyl which is initially decomposed to that which is substantially used for the actual filament formation is only from $1:10^4$ to $1:10^7$. The initial use of a very small quantity of metal carbonyl prevents the spontaneously formed chains from thickening due to deposits thereon of further ferromagnetic elementary particles and also prevents these particles from growing into larger ferromagnetic particles before the chains are formed.

The above-described primary coagulated chains are assisted in their magnetic alignment by the homogeneous magnetic field, which also aids the connection of the chains to form longer aggregates. The homogeneous magnetic field serves the further and most important purpose of preventing these longer chain aggregates from becoming deformed and torn on account of Brownian movement, i.e., the random movement exhibited by microscopic particles while suspended in a liquid or gaseous medium due to the impact of molecules of the surrounding field on the particle. Thus, this measure makes it possible to maintain the chain aggregates for any desired period, while without the magnetic field the chains could only exist for a short time before changing into granular aggregates.

The primary chains and the longer chain aggregates, mechanically stabilized by the magnetic field, are repelled from each other as soon as they are arranged in parallel formation. This occurs since the chains represent microfine parallel magnetic rods that fill out the space between the heating surface 2 and the discharge source 3, although they were originally formed in a restricted zone of the temperature gradient field.

Once the primary chain is formed, additional quantities of metal carbonyls are then discharged from the source 3 to thicken the extremely thin primary chains by means of additional metal deposits thereon. As discussed above, the primary chain is thickened after the temperature of the chain-like aggregate is lowered to accomplish coherent deposition of the metals. It is a characteristic of the process of the invention that the formation of the primary chains can determine the final length of the thicker metal filaments to be made therefrom and this length can be up to several centimeters, for example.

The length of each primary chain is determined by the length of the discharge source 3, since the source length defines the length of the cloud of metal colloids introduced to the reaction chamber and out of which the primary chains are formed. It has been found that the primary chains become very firmly anchored to the surface of solid objects and that such anchoring can be of substantial assistance in achieving mechanical stability of the chains. Therefore, the length of the chains is restricted by the walls 6 and 7 of the reaction vessel and by the walls 8 and 9 within the chamber.

It is a further characteristic of the process of the invention that the magentic field serves to stabilize the chains magnetically. When a sufficient quantity of magnetically stabilized chains have been formed in the reaction chamber, it is desirous to prevent the formation of additional chains even upon the discharge of further quantities of metal compound into the reaction chamber. This is achieved by lowering the temperature of the chains which is accomplished, in practice, by lowering the temperature in the reaction chamber to a value sufficient to cause coherent precipitation of metal from the metal carbonyls subsequently fed into the reaction chamber so that no additional chains form. Thus, additional amounts of carbonyls of ferromagnetic metals are not discharged into the chamber until the temperature of the chamber containing the chains has dropped to a point at which neither new chains nor larger aggregates of metal particles, which could be collected into lines by the magnetic field, can form. At this lower temperature the metal carbonyls are directly deposited on the chains previously formed.

In the preferred embodiment the temperature gradient within the chamber is reduced by lowering the temperature of the heating surface 2 until the chamber containing the chains to be thickened is at a temperature known to be necessary for the coherent deposition of metals from gaseous metal compounds. As is known in the art, the particular decomposing temperature is substantially lower than the temperature at which complete decomposition of the metal carbonyl takes place. In the case of iron pentacarbonyl the particular decomposing temperature is in the range of about 60° C. to 200° C. when the coagulated chains are of iron crystallites, since iron catalytically accelerates the decomposition of iron pentacarbonyl. The temperature required for suitable decomposition of the iron carbonyl or other metal compounds is controlled by one or more thermoelements, not shown.

By coherent deposition of metals is meant the formation of a deposit in such a manner that the minute metal crystallites which are formed on the surface of the filament grow rigidly and coherently together and do not form, as for example, merely independent deposits of crystalline particles that are not rigidly interconnected.

If nonferromagnetic metals are to be deposited from carbonyls requiring a higher decomposing temperature, the temperature must be raised appropriately. Since fresh quantities of metal carbonyl are continuously fed from the source 3 to the chains and decompose on or between the chains, the diameter of the chains grows continuously so that in a short time it increases by a multiple equal to several powers of ten. The metal filaments thus obtained have a homogeneous composition of extremely fine individual crystallites and are not magnetically determined aggregates of granular metal cores or polycrystalline metal grains.

At the second stage of the process, that is, the deposition of metal upon the magnetically stabilized chains, it is not necessary to use ferromagnetic metals, since it is possible to thicken the chains with metals other than that of which the chains themselves are composed. Such metals can be deposited from ferromagnetic metal carbonyls or from other thermally decomposed metal carbonyls, so that the process of the invention can be used to produce metal filaments of, for example, molybdenum, tungsten, platinum or other precious metal carbonyls. Moreover, the filaments produced by the process of the invention are not restricted to pure metals, since alloys or compounds may be deposited from the gas phase.

In the apparatus shown in FIGURES 2 and 3 the temperature gradient is produced between a heated, perforated metal tube 2' and a perforated metal tube 3' which is disposed concentrically therein. The tube 3' represents the vaporizing source for the metal carbonyl. The outer surface of the tube 2' is provided with heating bars 10 between which there are gaps for the exit of gas from the reaction chamber 1'. Within the gaps there is an insulated electric resistance heating element. The heating bars 10, which may be connected in series or in parallel as desired, are hermetically enclosed in a tube 11 which opens into a gas exhaust tube 12. Inside the perforated tube 3' there is provided a tube 13 which is heated to over 102° C. by a thermostatically controlled liquid. Wound around the tube 13 there is a spiral 14.

The thermostatically controlled liquid is fed through the tube 13' that is disposed within tube 13 and this liquid flows in counter current through the space between the tubes 13 and 13'. A small tube 15 is provided and a liquid material, such as liquid from iron pentacarbonyl, fed through the tube into the space between the heating tube 13 and the perforated tube 3', and thereafter trickles down the spiral 14 in a helical path.

A movable plunger 16 is provided within the perforated tube 2' and substantially closes the top of the chamber provided therein. Due to a loose fit, inert gases are admitted into the reaction chamber under pressure to replace the normal oxygen medium. This plunger forms a point of attachment for one end of the chains to be subsequently formed of coagulating ferromagnetic primary particles and serves to eject the finished metal filaments downwardly into the removably mounted collecting vessel 17, shown in FIGURE 3. The plunger also determines the length of the filament to be formed.

Prior to removal from the chamber, the fine metal filaments are subjected to a flow of an inert gas that is admitted through the inlet 18. This prevents spontaneous oxidation of the filaments upon removal from the chamber. As shown in FIG. 3, a geared motor 19 moves the plunger 16 up or down by means of a shaft 20 for removal of the filaments. Thereafter, inert gas is fed to the reaction chamber 1' by means of pipes 21 and 22.

This apparatus operates as follows: Inert gases are fed through the pipes 21 and 22, shown in FIGURE 3, to fill the reaction chamber 1'. A small quantity of iron carbonyl is fed through tube 15 and on contacting the heated spiral 14, evaporates and passes, in the vapor state, through the perforated tube 3' into the reaction chamber 1'. Within the chamber it forms metal colloids within an annular zone between the tube 2' and 3'. The metal colloids immediately and spontaneously form coagulated chains. These chains are stabilized by a homogeneous magnetic field, whose lines of force extend in the direction of the axis of the tube 2'. This field, as brought out above, is produced in conventional manner by means of a pair of magnets or a magnetic coil of at least 5000 gauss and maintained until the primary chain is formed. Thereafter, additional iron carbonyl or some other thermally decomposable metal carbonyl, such as nickel tetracarbonyl, is fed through the tube 15. This is carried out after the temperature in the reaction chamber 1' has been lowered. Thus, the metal carbonyl is continuously evaporated in large quantities and leaves the source 3' to become decomposed on the coagulated chains, while additional small quantities of inert gas are fed through the admission tube 15 or the pipes 21 and 22. It is important that rate of admission of the inert gas is such that turbulence is not produced. Further, a slight overpressure is maintained in the reaction chamber 1' to maintain complete exclusion of all oxygen. Also, the chamber may be subjected to a vacuum. When the primary coagulated chains have been sufficiently thickened, the metal filaments that are formed are ejected into the collecting vessel by movement of the plunger 16.

The evaporation of the thermally decomposable metal compounds in the reaction chamber, for thickening the chains by metal deposition, has the important advantage that the metal carbonyl can be vaporized at a relatively rapid rate and decomposed at a corresponding rate. Since the carbonyl is evaporated in the reaction chamber, it is possible to convey, directly to the reaction zone in the vapor state, not only liquid thermally decomposable metal carbonyls but also solid thermally decomposable metal carbonyls, such as for example, molybdenum carbonyl, which have been dissolved in an inert liquid such as an oil.

The fine grain crystalline metal filaments produced by the process of the invention are very strong. They are thus particularly suitable for the manufacture of sintered bodies, since, unlike other fibers of a nonhomogeneous structure, they do not break on pressing but retain their thread-like structure even after sintering and shaping. These filaments are also suitable, on account of their strength and high diameter/length ratio, for conventional placing in a matrix. The metal filaments produced by the process of the invention can also be made into compact materials by cold shaping methods, such as cold rolling or pressing or by cold welding. The process of the invention also includes the manufacture of metal filaments resulting from the simultaneous deposition of metals forming various carbonyl or from the simultaneous deposition of metals and nonmetals. During the formation of the metal filaments with the technique of thickening chains by metal deposition, it is possible to deposit nonmetallic substances with the metal, either continuously or at intervals. It is also possible to interrupt the deposition of metal to perform intermittent oxidation, nitration, etc., of the surface in order to alter the chemical characteristics.

The inclusion of, or zonal deposition of, nonmetals may be effected, for example, in order to suppress the growth of the crystallites of the polycrystalline metal filaments at high temperatures.

While the invention has been particularly shown and described to carry out the objects of the invention as set out above, it will be understood by those skilled in the art that various changes in form and details may be made therein without departing from the spirit and scope of the invention as defined by the annexed claims.

Having described the invention what is claimed is:

1. In a process for the manufacture of polycrystalline metal filaments having controlled length and thickness, comprising feeding small quantities of carbonyls of ferromagnetic metals into an oxygen-free chamber in the proportion of from approximately $10^{-4}$ to $10^{-10}$ moles per cubic centimeter of chamber volume, simultaneously providing a temperature gradient for thermally decomposing the carbonyl and a homogeneous magnetic field within the chamber whereby the metal atoms which are liberated by the thermal decomposition of the carbonyls agglomerate to form minute crystallites that are arranged in chain-like aggregates by the homogeneous magnetic field, the chain-like aggregates being parallel to each other and to the lines of force of the magnetic field and made mechanically stable by the field, reducing the temperature of the chain-like aggregates for accomplishing coherent deposition of additional metal atoms of carbonyl vapor on the chain-like structure, and feeding relatively larger quantities of carbonyls selected from the group consisting of ferromagnetic carbonyls and paramagnetic carbonyls and mixtures thereof into the chamber and against the reduced temperature gradient until the chain-like aggregate forms a filament of predetermined thickness.

2. The process as defined in claim 1 wherein the metal atoms of carbonyl vapors of ferromagnetic and paramagnetic carbonyls are simultaneously deposited on the chain-like aggregates to form a coherent cross-sectional filament of said predetermined thickness.

3. The process of claim 1, in addition, comprising simultaneously with the feeding of additional vapors of magnetic metals chemically treating the chain-like aggregate whereby the chemical treatment is interposed between the deposition of multiple layers.

4. The process of claim 1, in addition, comprising forming a plurality of filaments into a sintered mass.

5. The process of claim 1 wherein the metal atoms of carbonyl vapor are fed into the reaction chamber in an inert solvent.

6. The process as defined in claim 1 wherein metal atoms of carbonyl vapor of ferromagnetic carbonyls are deposited on the chain-like aggregates to form a coherent cross-sectional filament of said predetermined thickness.

7. The process as defined in claim 1 wherein metal atoms of carbonyl vapor of paramagnetic carbonyls are deposited on the chain-like aggregates to form a coherent cross sectional filament of said predetermined thickness.

8. The process as defined in claim 1 wherein the carbonyl is fed directly into the mangetic field and temperature gradient.

References Cited

UNITED STATES PATENTS

| | | | |
|---|---|---|---|
| 2,862,783 | 12/1958 | Drummond | 117—107.2 X |
| 2,884,319 | 4/1959 | Fabian et al. | 75—0.56 |
| 2,887,088 | 5/1959 | Nack | 117—107.2 X |
| 2,888,375 | 5/1959 | Drummond | 117—107.2 X |
| 2,986,115 | 5/1961 | Toulmin | 117—107.2 X |
| 3,021,230 | 2/1962 | Deriaud | 117—93.2 |
| 3,178,280 | 4/1965 | McGee et al. | 75—200 |
| 3,206,325 | 9/1965 | Averbach | 117—107.2 X |
| 3,278,279 | 10/1966 | Kraft et al. | 75—200 |

BENJAMIN R. PADGETT, *Primary Examiner.*

A. J. STEINER, *Assistant Examiner.*

U.S. Cl. X.R.

75—200, 224; 117—107.2